United States Patent [19]

Gardikes

[11] 4,179,427

[45] Dec. 18, 1979

[54] PHENOLIC RESIN-POLYISOCYANATE BINDERS

[75] Inventor: John J. Gardikes, Worthington, Ohio

[73] Assignee: Ashland Oil, Inc., Ashland, Ky.

[21] Appl. No.: 888,715

[22] Filed: Mar. 21, 1978

[51] Int. Cl.$^2$ .................... C08L 61/14; C08L 75/08
[52] U.S. Cl. ........................ 260/29.2 TN; 260/29.3; 260/37 N; 260/38
[58] Field of Search ............ 260/29.2 TN, 29.3, 37 N, 260/38, DIG. 40

[56] References Cited

U.S. PATENT DOCUMENTS

| | | | |
|---|---|---|---|
| 3,409,579 | 11/1968 | Robins | 260/DIG. 40 |
| 3,428,110 | 2/1969 | Walker | 260/DIG. 40 |
| 3,702,316 | 11/1972 | Robins | 260/38 |
| 4,051,092 | 9/1977 | Holik et al. | 260/29.2 TN X |

*Primary Examiner*—Sandra M. Person
*Attorney, Agent, or Firm*—T. Gene Dillahunty

[57] ABSTRACT

Phenolic resin-polyisocyanate binder systems comprising aqueous emulsions of a phenolic resin and a liquid polyisocyanate and a tertiary amine or metal ion curing agent can be made and used free of organic solvents, thereby providing improved environmental conditions. These binders are useful as foundry core and mold binders in both cold box and no bake operations.

20 Claims, No Drawings

PHENOLIC RESIN-POLYISOCYANATE BINDERS

BACKGROUND OF THE INVENTION

This invention relates generally to binder compositions which are useful in bonding materials such as aggregates to form shaped articles and are particularly useful in bonding foundry aggregate such as sand in making foundry cores and molds. The binder compositions to which the invention relates comprise a phenolic resin component, a polyisocyanate hardener component and a curing agent and are capable of being cured at room temperature. This type of binder composition is well-known in the prior art: U.S. Pat. No. 3,409,579 and U.S. Pat. No. 3,676,392 are examples of detailed disclosures of these binder compositions; the disclosures of these patents are hereby incorporated herein by reference. Generally, the resin component comprises an organic solvent soluble phenolic resin which is the condensation product of a phenol having the general formula

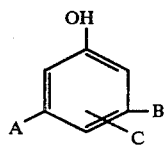

wherein A, B, and C are hydrogen, hydrocarbon radicals, oxyhydrocarbon radicals, or halogen, with an aldehyde having the general formula R'CHO wherein R' is a hydrogen or a hydrocarbon radical of one to eight carbon atoms. The phenolic resins employed in these binder compositions can be either resole or A-stage resins or novolac resins. The resitol or B-stage resins, which are a more highly polymerized form of resole resins, have generally been unsuitable because they are solid resins. The phenolic resins useful in these binder compositions have been somewhat further limited in that they must be liquid or must be organic solvent soluble. Although both the resole resins and the novolac resins which meet the above criteria can be employed in these binder compositions, the novolac resins have generally been preferred over the resole resins, because many resole resins are difficultly soluble in the desirable organic solvents and many have a higher water content than has been generally desired in the past for these binder compositions. The preferred novolac resins have been those in which the phenol is prevailingly polymerized through the two ortho positions.

Benzylic ether resins, which comprise one species of the phenolic resins preferred in these binder compositions, are characterized by containing a unit having the formula

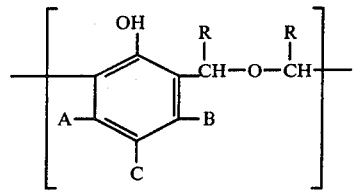

wherein A, B, and C are hydrogen, hydrocarbon radicals, oxyhydrocarbon radicals or halogen, the R's are individually H or hydrocarbon radical of one to eight carbon atoms, and the average degree of polymerization, as measured by the number of repeating aromatic rings, is generally 3 to 100 and preferably 4 to 10. Although higher molecular weight resins are operable in these binder compositions, such resins are difficult to handle from the standpoint of viscosity in requiring excessive amounts of solvents to bring the viscosity of the resin component to a level normally desired. Due to sand flowability, the speed of cure, strengths, and shake-out characteristics, the especially preferred phenolic resins for foundry binders have been the benzylic ether resins disclosed and described in detail in U.S. Pat. No. 3,485,797, and having the following general formula:

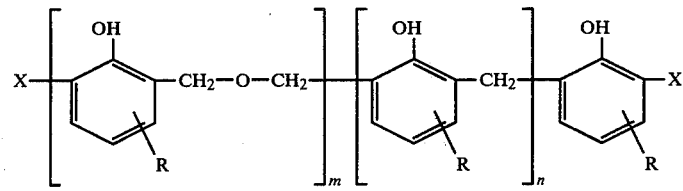

wherein R is hydrogen or a phenolic substituent as described in the above-mentioned patents, the sum of m and n is at least two, the ratio of m to n is at least one, and X is an end group selected from the group consisting of hydrogen and methylol, with the molar ratio of said methylol to hydrogen end groups being at least one.

The hardener component of these binder compositions is fully described in above-mentioned '579 and '392 patents and comprises an aliphatic, cycloaliphatic, or aromatic polyisocyanate having preferably from two to five isocyanate groups. If desired, mixtures of polyisocyanates can be employed. Isocyanate prepolymers formed by reacting excess polyisocyanate with a polyhydric alcohol, e.g., a prepolymer of toluene diisocyanate and ethylene glycol, can be employed. Suitable polyisocyanates includes the aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylene polyphenyl isocyanates, chlorophenylene-2,4-diisocyanate, and the like. Although all polyisocyanates react with the phenolic resin to form a cross-linked polymer structure, the preferred polyisocyanates are aromatic polyisocyanates and particularly the diphenylmethane diisocyanates, the trimethylene triphenyl triisocyanates, and mixtures thereof.

The curing agents useful in these binder compositions include tertiary amines as described in U.S. Pat. No. 3,409,579, the base catalysts described in U.S. Pat. No. 3,676,392, and metal ion catalysts described in U.S. Pat. No. 3,429,848. The catalyst and the amount thereof to be used in these binder compositions is selected by one skilled in the art, depending upon the use of the binder composition, the work-time desired, and the curing time desired. For example, when using these binder compositions in a foundry application a tertiary amine vapor will be used as described in the '579 patent when long work times are desired and essentially instanteous curing times are desired, such as in a typical foundry cold box operation; the base catalyst of the '392 patent or the metal ion catalyst of the '848 patent would be employed when a controlled ratio of work time to strip time is desired, such as in a foundry no-bake operation.

It is taught throughout the prior art relating to these binder compositions that the presence of water is detrimental to the performance of the binder. It is generally taught that the phenolic resin used in these binder compositions should be less than 5% by weight of water and preferably less than 1% by weight of water. In addition, it is generally taught in the prior art that the water content of the material being bonded with these binder compositions should be very low. For example, for foundry sand the moisture content should be less than 1% by weight based upon the weight of the sand. The reason for the necessity of low water levels in the binder composition and the material being bonded with the binder has been that the presence of water interferes with the isocyanate and with the urethane-type reaction involved, thereby weakening the effectiveness and performance of the binder composition.

It is generally taught in the above-mentioned prior art that the binder compositions to which this invention relates must be used in organic solvents. The solvent is necessary in order to evenly distribute the active components of the binder composition on the material or aggregate being bonded with the binder composition. These solvents are generally disclosed in the above-mentioned '579, '392 and '848 patents. Other specific solvent systems for these binder compositions are disclosed in U.S. Pat. No. 3,726,867 and U.S. Pat. No. 3,905,934. While these organic solvents of the prior art provide these binder compositions with excellent performance characteristics, these solvents have the disadvantage of being atmosphere polluting. For example, the solvents can evaporate and escape into the atmosphere during the mixing of the binder compositions with the material or aggregate to be bonded. In a foundry operation the organic solvents contribute to the emissions which occur during the metal pouring.

DESCRIPTION OF THE INVENTION

It is an object of this invention to reduce or eliminate the presence of organic solvents in the phenolic resin-polyisocyanate binder systems, especially the aromatic type of organic solvents, which are more objectionable from the environmental aspect than the aliphatic type of organic solvents. It is another object of this invention to provide a means by which phenolic resin-polyisocyanate binder systems can be used without the attendant disadvantages resulting from the presence of organic solvents. It is another object of this invention to provide another medium which can be used in the place of all or a portion of the organic solvents in such binder systems and which will continue to provide such binder systems with excellent performance characteristics. Another object of this invention is to provide a medium which will reduce the tendency of these binder systems to cause atmospheric pollution and to reduce the emissions occurring when these binder systems are used in foundry operations.

It has been discovered that organic solvents can be eliminated from phenolic resin-polyisocyanate binder systems by using aqueous emulsions of the phenolic resin with a liquid polyisocyanate and the desired curing agent. It surprisingly has been found that the aqueous emulsion phenolic resin-liquid polyisocyanate binder system of this invention gives excellent performance characteristics as a binder, particularly as a foundry binder. This is particularly surprising in view of the teachings throughout the prior art that phenolic resin-polyisocyanate binder systems are sensitive to the presence of water, and that water can lessen or destroy their performance as binders. In addition, it has been recognized that the presence of significant amounts of water was particularly detrimental in causing excessive porosity defects in the metal casting. Unexpectedly, it has been found that the aqueous emulsion phenolic resin and liquid polyisocyanate binder system of this invention when used as a foundry binder gives good performance with respect to core strength, erosion resistance and shake-out; no pinholing has been observed.

The prior art teaches that phenolic resin-polyisocyanate binder systems can be rendered insensitive to the presence of water for some applications by the use of certain solvent systems such as the combination of aromatic and polar organic solvents. It is disclosed in U.S. Pat. No. 4,048,103 that when the entire system (the phenolic resin, polyisocyanate, and catalyst) is dissolved in large amounts of such aromatic and polar organic solvents, the system becomes insensitive to water to the extent that the compositions may be used as fillers on substrates that contain moisture and the compositions may be extended with water before use as a filler. Such use of high proportions of organic solvents, particularly the aromatic type, is contrary to the objects of this invention. In view of this and other disclosures, it is particularly surprising, therefore, that phenolic resin-polyisocyanate binder systems having good performance characteristics can be made using a water emulsion of the phenolic resin component containing little or no organic solvent and a liquid polyisocyanate also containing little or no organic solvent.

The basic concept of this invention resides in the fact that organic solvents can be reduced or eliminated from phenolic resin-polyisocyanate binder systems by the use of aqueous emulsion of the phenolic resin with a liquid polyisocyanate. Without using the aqueous emulsion phenolic resin in accordance with this invention, the organic solvents must be used in order for the resin component to be evenly distributed on the aggregate to be bonded. While not wishing to be bound by theory, it is believed that the aqueous emulsion phenolic resin and liquid polyisocyanate system of this invention performs well as a binder because of the competing reactions involved. Apparently, the water present in the phenolic resin emulsion reacts to some extent with the polyisocyanate, but the extent of that reaction is insignificant compared to the reaction of the phenolic resin with the polyisocyanate. It has been observed that, depending on the catalyst or curing agent, an additional excess of polyisocyanate is required, compared to that formerly used in the prior solvent systems, to develop the full or optimum strengths of the binder systems of this invention.

The advantages of the present invention are numerous. The use of aqueous emulsion instead of organic solvents will reduce atmospheric pollution and reduce hydrocarbon emissions during use of the binders. Eliminating organic solvents will reduce the odor, thereby improving working conditions in the workers' environment. Likewise, eliminating aromatic solvents will reduce objectionable emissions and improve working conditions.

This invention will also allow the use of certain phenolic resins which have heretofore not been considered usable in a phenolic resin-polyisocyanate system. The water content of some phenolic resins was considered too high for effective performance. Since this invention essentially eliminates water content as a criteria for selecting phenolic resins for these binder systems, the phenolic resin can now be selected on the basis of the strength and other characteristics exhibited by the binder, without regard to the water content of the phenolic resin. In the past some phenolic resins were not suitable because they are not soluble in an organic solvent compatible with the binder system as a whole. This invention eliminates organic solvent solubility as a criteria for selecting phenolic resins for these binder systems. Any phenolic resin that can form an emulsion with water can now be considered for use in a phenolic resin-polyisocyanate binder system in accordance with this invention.

Another advantage of this invention resides in providing more efficiency in the processing of phenolic resins for use in phenolic resin-polyisocyanate binder systems. By eliminating or minimizing the final step in the manufacture of such resins of dehydration or removal of water to provide a resin with a low water content, considerable cost savings can be realized. It has been found that the phenolic resin/water reaction mixture existing before the dehydration step can be made into an emulsion suitable for use in the phenolic resin-polyisocyanate binder systems of this invention, thus eliminating the need for the final dehydration of the resin. In this same regard, this invention allows use of the more convenient aqueous formaldehyde, instead of having to use the higher cost paraformaldehyde in order to keep the water content of the resin low.

The emulsions of phenolic resins can be prepared for use according to this invention in a stable form so that they can be provided as one package and the liquid polyisocyanate provided as the second package, which are shipped, stored and used in the conventional manner. When desired for certain applications, such as foundry no-bake operations, the curing agent may be combined with the resin component or with the polyisocyanate component, or can be provided separately when desired, for example, when used in a foundry cold box operation.

The binder systems of this invention can be used without the presence of organic solvents, for example, the phenolic resin in water emulsion can be used with a polyisocyanate which is liquid at room temperature without being dissolved in organic solvents. However, the common, commercially used phenolic resin-polyisocyanate binders cured in the absence of organic solvents have been found to be somewhat friable for some applications. For example, foundry cores made with such binders are friable and, as such, have poor handling characteristics. It has been found that for such applications a hydrocarbon material should be included in the binder system. It is believed that the hydrocarbon material acts as a plasticizer of the cured phenolic resin-polyisocyanate binder. The hydrocarbon material may be employed in a number of ways. It may be included in the phenolic resin emulsion, provided that the hydrocarbon material does not react to any significant degree with the phenolic resin and does not interfere with forming the aqueous emulsion of the resin, or it may be included in the polyisocyanate, provided that it does not react to any significant degree with the polyisocyanate, or in both. Examples of such hydrocarbon materials include ethers, such as diethylene glycol dimethyl ether, triethylene glycol dimethyl ether, diethylene glycol diethyl ether, diethylene glycol dibutyl ether, and tetraethylene glycol dimethyl ether; esters, such as hexylene glycol diacetate, ethylene glycol diacetate, ethylene glycol monomethyl ether acetate, ethylene glycol monoethyl ether acetate, ethylene glycol monobutyl ether acetate, triethylene glycol diacetate, diethylene glycol monoethyl ether acetate, diethylene glycol monobutyl ether acetate, dialkyl phthalates, such as dibutyl phthalate, and dialkyl esters of dicarboxylic acids, such as dimethyl adipate, dimethyl glutarate and dimethyl succinate; and ketones such as isophorone. Generally, such hydrocarbon materials should be used only in amounts sufficient to obtain the desired or optimum properties in the binder system; higher amounts of these materials will reduce the strength performance of the binder. The optimum amount will vary depending on the particular binder system employed and can be easily determined by one skilled in the art. An additional polyol may be included with the phenolic resin to plasticize the cured binder, such as polyesters, polyethers, alkyds, acrylics, and other polyols conventionally used in polyisocyanate systems. Such polyols may also be prereacted with the polyisocyanate to provide the desired plasticized binder. Particular polyisocyanates can be used to plasticize the binder in the absence of the above hydrocarbon materials, such as polyisocyanates extended with polyethers or polyesters. These extended polyisocyanates can be used alone or as mixtures with other polyisocyanates, or in combination with the above hydrocarbon material. When these extended polyisocyanates are used, hydrocarbon material can be reduced in amount or eliminated. In each of the above cases, the material used to plasticize the binder may also be employed to obtain the desired viscosity of that binder component to provide for optimum binder performance on the particular aggregate or substrate on which the binder is used.

The phenolic resins useful in this invention are, as described above, generally of the type described in the prior art in connection with phenolic resin-polyisocyanate binder systems plus the other phenolic resins not suitable for use in prior art systems due to having a high water content or not being soluble in organic solvents. Thus, this invention in particular opens up this binder technology to using the resole resins which typically have higher water contents and are not highly soluble in organic solvents. Modified and substituted phenolic resins may also be used. However, the preferred resins for use in this invention are the benzylic ether resins described above.

The phenolic resin must be capable of forming a stable emulsion with water. The selection of the particular phenolic resin for a particular intended use of the phenolic resin-polyisocyanate binder system will readily be accomplished by one skilled in the art. Liquid resins are preferred, however, solid phenolic resins which can be softened with water or an organic solvent then emulsified may also be used. As described above, other polyols may be included with the phenolic resin in the phenolic resin component, such as polyester resins, polyether resins, alkyd resins, acrylic resins and the like, provided such other polyol does not interfere with formation of the emulsion.

The phenolic resin component of the binder systems of this invention are aqueous emulsions which generally contain from about 35% to about 75% by weight resin and about 25% to 65% water. The preferred emulsion contains about 45% to 65% resin; the most preferred resin content is about 50% to 60%.

As used in the specification and claims hereof, the term "emulsion" includes both the water-in-oil and the oil-in-water type of emulsions, as well as dual emulsions, which exhibit some characteristics of both types of emulsions.

The phenolic resin emulsions of this invention are prepared by employing conventional methods and conditions and conventional emulsifiers and stabilizers. While some phenolic resins can be formed into emulsions by high shear or high energy mixing or agitation alone, it is preferred to use emulsifiers and/or emulsion stabilizers, such as gum arabic, polyvinyl alcohols, hydroxyethyl cellulose, and sodium salt of condensed naphthalene sulfonic acid. It has been found that while the emulsifiers like hydroxyethyl cellulose aid in forming good emulsions, the sodium salt of condensed naphthalene sulfonic acid aids in the stability of the emulsion, particularly with respect to freeze-thaw stability. These emulsifiers and stabilizers are used in conventional amounts which are sufficient to obtain the optimum and desired emulsion characteristics. Typically, the emulsifying and stabilizing agents are used in amounts varying from about 0.1% to about 2% by weight based on the weight of the emulsion. However, particular emulsifiers or stabilizers can be used in lesser or greater amounts, for example, if the emulsifier is a coreactive polyol, it can be used in greater amounts.

The emulsifying/stabilizing agents may be cationic, nonionic or anionic and may be employed to adjust the viscosity of the emulsion, as well as shelf life and other properties of the emulsion.

Emulsions having the characteristics of oil-in-water emulsions are preferred in this invention due to the fact that the viscosity of those emulsions is generally more suitable, but water-in-oil emulsions are also useful in this invention, provided the viscosity is suitable for applying the resin emulsion to the desired aggregate or substrate.

The polyisocyanates useful in this invention are in liquid form. Liquid polyisocyanates can be used in undiluted form or, as indicated above, a hydrocarbon material may be added to the liquid polyisocyanate to increase the strength and utilization of the cured phenolic resin-polyisocyanate binder. The polyisocyanates set forth in the above prior art for phenolic resin-polyisocyanate systems are equally applicable to this invention. The polyisocyanate commercially available from Mobay Chemical Corporation under the trademark "Mondur MR" is one that is commonly used in these binder systems. The extended polyisocyanates, mentioned above in connection with plasticizing the binder, include polyether extended polyisocyanates, such as "Isonate 181" from UpJohn and "Mondur PF" from Mobay, and polyester extended polyisocyanates, such as "Isonate 226" from UpJohn and "Mondur M420" from Mobay. Solid or viscous polyisocyanates can be employed in the form of liquid solutions, the solvent being an organic solvent present in amounts sufficient to provide the viscosity necessary for proper distribution of the polyisocyanate on the aggregate or substrate along with the resin emulsion. As used herein, the term "liquid polyisocyanate" includes both polyisocyanates which are liquid at room temperature and polyisocyanates which are liquid at room temperature when diluted with or dissolved in organic solvent.

The proportion of the phenolic resin emulsion and the liquid polyisocyanate components used in this invention are similar to those proportions which are conventionally used in phenolic resin-polyisocyanate binder systems. The polyisocyanate is employed in sufficient concentrations to cause the curing of the phenolic resin. In general, the polyisocyanate will be employed in a range of 10 to 500 weight percent of polyisocyanate based on the weight of the phenolic resin emulsion, and preferably in a range from 20 to 300 percent. The amount of polyisocyanate used should provide an isocyanate to hydroxy ratio of about one or greater, and preferably a ratio between about 1:1 and 1.5:1, to assure sufficient polyisocyanate to react with the available hydroxy groups.

The curing agent used in this invention may be any curing agent for phenolic resin-polyisocyanate binder systems as known in the prior art discussed above. The selection of the curing agent, as indicated above, will be well within the capability of one skilled in the art, depending on the actual use of the binder system. It should be noted that in some instances, it may be desirable to combine two or more types of curing agents in a particular application of the binder of this invention to obtain a desired result. For example, a metal ion curing agent may be included in either the phenolic resin package or the polyisocyanate package, or both, while still using another curing agent as the primary curing agent, such as a tertiary amine in vapor form. The preferred curing agents employed in this invention are the tertiary amines, such as triethyl amine, dimethylethyl amine, dimethyl ethanol amine, pyridine, 4-phenylpropyl pyridine, 2,5-lutidine, 3,5-lutidine, 4-ethyl pyridine, 4-t-butyl pyridine, 4-benzyl pyridine, acridine, 2-methoxy pyridine, 3-chloro pyridine, quinoline, N-methyl imidazole, 1,4-thiazine, morpholine, and N-methyl morpholine.

The binder systems of this invention are useful as foundry binders, and in bonding other materials such as wood, wood particles, and gravel and other aggregates, when applied to such materials in a binding amount, which amount will be readily determined for each such material by one skilled in the art. The compositions of this invention are also useful as casting resins to form shaped articles. In this application these compositions may be filled with various fillers such as wood flour, clay, calcium carbonate, sand, metal particles, glass or synthetic polymeric hollow microspheres and the like, as illustrated in the disclosures of U.S. Pat. Nos. 3,941,743 and 4,048,103. The compositions of this invention are also useful for making rigid foams and for coatings.

This invention will be further illustrated by particular use of the phenolic resin emulsion-polyisocyanate binder system as a foundry binder. The foundry aggregate, sand, is usually the major constituent in a foundry mix prepared for the production of foundry cores or molds. The binder composition constitutes generally less than 10% by weight based on the weight of the sand and usually within the range of 0.25% to about 5%. Although the sand employed is preferably dry, the moisture content of the sand is not critical with respect to using the phenolic resin emulsion-polyisocyanate binder system of this invention. However, it is desirable that the moisture content of the sand be low enough so that the sand is substantially free-flowing. When the sand is free-flowing, the water content of the sand normally will not be a factor with respect to performance of the binder system of this invention. The phenolic resin emulsion and the liquid polyisocyanate are mixed with the sand in any manner well known to those skilled in the foundry art. The resulting foundry mix is then shaped into the desired core or mold configuration whereupon the binder composition is cured. Curing is effected either by passing a tertiary amine through the shaped mix, such as described in U.S. Pat. No. 3,409,579, or is cured by the action of a curing agent included in the foundry mix, such as set forth in U.S. Pat. Nos. 3,676,392 and 3,429,848.

Various optional ingredients may be included in the foundry mix for various purposes. Conventional foundry mix additives include such items as iron oxide, ground flax fibers, pitch, refractory flours and the like. A particularly valuable additive to phenolic resin-polyisocyanate binder systems when used with certain types of sand is a silane compound having the formula (R'O)$_3$SiR, wherein R' is a hydrocarbon radical and preferably an alkyl radical of 1 to 6 carbon atoms and R is an alkyl radical, an alkoxy-substituted alkyl radical, or an alkyl amine-substituted alkyl radical in which the alkyl groups have from 1 to 6 carbon atoms. The silane compound is usually employed in concentrations of 0.1% to 2% by weight based on the weight of the phenolic resin-polyisocyanate binder composition. The silane compound improves the adhesion of the binder to the foundry aggregate as discussed in more detail in the above U.S. Pat. No. 3,429,848. Other conventional additives which may be used in the foundry mix in connection with the binder compositon of this invention include organic fatty acids, such as those disclosed in U.S. Pat. No. 3,632,844, which lower the tendency for cured cores to stick to the surfaces of the core box. In addition, it has been found that organic acids such as citric acid, benzoic acid, or salicylic acid, improve the flowability of the foundry mix made with the phenolic resin emulsion-liquid polyisocyanate binder system of this invention.

The following examples further illustrate this invention.

EXAMPLE 1

A benzylic ether phenolic resin is prepared as follows: 634.24 parts of phenol, 364.5 parts of 91% paraformaldehyde (flake) were charged to a reaction vessel along with 0.88 parts lead naphthenate (24% lead) and 0.39 parts lead oxide. The reaction mixture was heated to about 110° C. to initiate the exotherm, then the temperature maintained between about 110° and 114° C. for two hours. The reaction mixture is then heated under atmospheric dehydration conditions to about 125° C. and held at this temperature until all the formaldehyde has reacted. A vacuum was applied and the resin cooled to room temperature for use in the examples illustrating this invention.

EXAMPLE 2

An aqueous emulsion of the phenolic resin of Example 1 was formed from the following:
60.00 parts phenolic resin of Example 1
39.40 parts water
0.60 parts Cellosize QP 15,000
0.75 parts Tamol SN "Cellosize QP 15,000" is an ethoxylated cellulose, commercially available under the "Cellosize" trademark from Union Carbide Corporation. "Tamol SN" is a sodium salt of condensed naphthalene sulfonic acid, commercially available under the "Tamol" trademark from Rohm and Haas. A 1.5% water solution of the Cellosize QP 15,000 was made by first dispersing the Cellosize QP 15,000 in cold water then adding the dispersion to hot water with agitation. The Tamol SN is then dissolved in this solution. The resulting water solution and the phenolic resin were placed in a Waring blender and blended at 17,000 RPM. The initial mixing resulted in a thick mixture, after which the mixture appeared to undergo a phase inversion whereupon the mixing load on the blender dropped significantly and the viscosity became much lower. It is believed that this is the point at which the oil-in-water emulsion was formed. The final emulsion exhibited the characteristics of an oil-in-water emulsion, was stable through 3 freeze-thaw cycles to −6° C., and was stable after 2 weeks at 120° F.

EXAMPLE 3

The preparation of the emulsion of Example 2 was repeated except the Tamol SN was not used. The resulting emulsion was stable at room temperature over a period of 9 months, showing some tendency to separate into two layers. However, each of the two layers was a good emulsion, and the layers are easily remixed. This emulsion failed after one freeze-thaw cycle, and heating at 120° F. seemed to increase the rate of formation of the two layers of emulsions.

EXAMPLE 4

The phenolic resin emulsion of Example 2 was used to bond foundry sand to form standard dogbone test specimens at room temperature for testing tensile strength and scratch hardness. This is a foundry no-bake type test. The catalyst was 4-phenylpropyl pyridine mixed in the phenolic resin emulsion. The polyisocyanate was "Mondur MR" and was mixed with the organic solvent indicated. "Carbitol Acetate" is diethylene glycol monoethyl ether acetate; "Cellosolve Acetate" is ethylene glycol monoethyl ether acetate; and "Butyl Carbitol Acetate" is diethylene glycol monobutyl ether acetate, all from Union Carbide. Percentages are by weight based on the weight of the sand, unless otherwise indicated. The phenolic resin emulsion and the polyisocyanate/solvent/catalyst mixture were mixed with the sand in a conventional mixer; the sand mix was packed into conventional dogbone patterns and allowed to cure. Table I sets forth the test data.

EXAMPLE 5

The phenolic resin of Example 1 was emulsified using the procedure of Example 2 and the following:
65.0 parts phenolic resin of Example 1
33.5 parts water 1.5 parts Cellosize QP 52,000
Sand tests were run using this emulsion in the same dogbone tensile strength/scratch hardness test as set forth in Table III.

TABLE I

| TEST NO. | 1 | 2 | 3 | 4 | 5 | 6 |
|---|---|---|---|---|---|---|
| Wedron 5010 Sand | 3,000g | 3,000g | 3,000g | 3,000g | 3,000g | 3,000g |
| Phenolic Resin Emulsion | 0.67% | 0.75% | 0.75% | 0.75% | 0.75% | 0.75% |
| Catalyst (wt% based on emulsion) | 1.125% | 1.0% | 1.0% | 1.0% | 1.0% | 1.0% |
| Polyisocyanate | 1.34% | 0.60% | 0.60% | 0.60% | 0.60% | 0.60% |
| Solvent | None | 0.28% | 0.28% | 0.28% | 0.28% | 0.28% |
| Solvent Type | — | Carbitol Acetate | Diethylene Glycol Dimethyl Ether | Cellosolve Acetate | Ethylene Glycol Diacetate | Butyl Carbitol Acetate |
| Strip Time/Work Time (minutes) | 75/12 | 13/7 | 12/9 | 17/7 | 13/9 | 16/12 |
| Strip Time/Work Time Ratio | 5.8 | 1.9 | 1.3 | 2.4 | 1.4 | 1.3 |
| Tensile Strength (scratch hardness) | | | | | | |
| 2 Hours, Ambient | Very Weak | 200 (87) | 195 (85) | 172 (74) | 170 (93) | 148 (66) |
| 4 Hours, Ambient | Very Weak | 220 (90) | — | 155 (80) | 222 (93) | 202 (68) |
| 24 Hours, 81% relative humidity, 70° F. | 83 (49) | 205 (87) | 262 (76) | 175 (87) | 238 (85) | 197 (71) |
| 24 Hours, Ambient | — | 285 (90) | 310 (82) | 240 (80) | 272 (84) | 198 (74) |
| 48 Hours, Ambient | — | 255 (90) | 277 (76) | 182 (80) | — | 198 (74) |
| 120 Hours, Ambient | 112 (55) | — | — | — | 192 (84) | — |

TABLE II

| TEST NO. | 1 | 2 | 3 | 4* |
|---|---|---|---|---|
| Wedron 5010 Sand | 3,000g | 3,000g | 3,000g | 3,000g |
| Phenolic Resin Emulsion | 1.0% | 1.0% | 1.0% | 1.0% |
| Catalyst (wt% based on emulsion) | 1.0% | 0.5% | 0.5% | 0.5% |
| Polyisocyanate | 0.812% | 0.812% | 0.812% | 0.812% |
| Solvent | 0.271% | 0.271% | 0.271% | 0.271% |
| Solvent Type | Kodaflex TXIB | HiSol 10 | Isophorone | Diisobutyl Phthalate |
| Strip Time/Work Time (minutes) | 17/8 | 30/7 | 17/9 | 31/13 |
| Strip Time/Work Time Ratio | 2.1 | 4.3 | 1.9 | 2.4 |
| Tensile Strength (scratch hardness) | | | | |
| 2 Hours, 36% relative humidity, 73° F. | 140 (52) | 152 (58) | 200 (60) | 110 (49) |
| 4 Hours, Ambient Temperature | 162 (56) | 185 (62) | 192 (66) | 140 (43) |
| 24 Hours, 75% relative humidity, 73° F. | 198 (72) | 208 (72) | 227 (71) | 233 (72) |
| 24 Hours, 25% relative humidity, Ambient Temperature | 237 (68) | 187 (70) | 280 (72) | 148 (62) |
| 48 Hours, 25% relative humidity, Ambient Temperature | 230 (74) | 265 (71) | 292 (72) | 198 (65) |

*The phenolic resin emulsion for this test was 60 parts resin, 39.4 parts water and 0.6 parts Cellosize QP 52,000 prepared by the procedure of Example 2.

TABLE III

| TEST NO. | 1 | 2 | 3 | 4 |
|---|---|---|---|---|
| Wedron 5010 Sand | 3,000g | 3,000g | 3,000g | 3,000g |
| Phenolic Resin Emulsion | 22.5g | 22.5g | 22.5g | 22.5g |
| Tamol SN (wt% based on emulsion) | 0% | 0.2% | 0.5% | 1.0% |
| Catalyst | 0.315g | 0.315g | 0.315g | 0.315g |
| Polyisocyanate containing 30% Ethylene Glycol Diacetate | 22.5g | 22.5g | 22.5 | 22.5g |
| Strip Time/Work Time (minutes) | 27/11 | 28/16 | 26/12 | 24/14 |
| Strip Time/Work Time Ratio | 2.45 | 1.75 | 2.16 | 1.71 |
| Tensile Strength (scratch hardness) | | | | |
| 2 Hours, 46% relative humidity, 77° F. | 192 (91) | 165 (89) | 163 (82) | 143 (82) |
| 4 ¾Hours, Ambient Temperature | 212 (89) | 218 (94) | 232 (88) | 180 (90) |
| 48 Hours, 100% relative humidity, 73° F. | 65 (70) | 82 (75) | 53 (63) | 47 (61) |
| 48 Hours, 46% relative humidity, 77° F. | 205 (83) | 272 (84) | 172 (78) | 198 (80) |
| 216 Hours, Ambient Temperature | 112 (83) | 178 (84) | 98 (78) | 112 (82) | manner as in Example 4. "Kodaflex TXIB" is 2,2,4-trimethyl pentane-diol-1,3-diisobutyrate and "HISOL 10" is an aromatic solvent, having a boiling range of 315° F. to 350° F., available from Ashland Chemical Company. Table II sets forth the test data.

EXAMPLE 6

Test No. 5 of Example 4 was repeated except the phenolic resin emulsion was prepared with varying amounts of Tamol SN. These emulsions were subjected to three freeze-thaw cycles then used for the standard

EXAMPLE 7

Phenolic resin emulsions having varying percentages by weight resin were prepared as in Example 2 and used as a foundry sand binder in a cold box method to form standard dogbone test specimens at room temperature. The phenolic resin emulsion component and the polyisocyanate component were mixed with the sand, the sand mix was blown into the dog bone pattern, then gassed with dimethylethylamine curing agent diluted in carbon dioxide carrier gas. The curing agent was applied for 1 second followed by an 8 second purge with air, and the cured specimen was removed immediately from the pattern for testing. In all tests the phenolic resin emulsion contained 0.3% citric acid by weight based on the weight of the emulsion and 0.1% by weight based on the weight of total binder of "A-1100" silane compound commercially available from Union Carbide. The kerosene used was generally less than 8% by weight aromatic content. Table IV sets forth the test data.

about ½ hour to dissolve these components. The resulting mixture was cooled to room temperature and upon high shear mixing an oil-in-water emulsion was formed. The emulsion did not separate on standing at room temperature; however, it appeared to have a high viscosity and it appeared that it would have poor long-term stability.

It should be noted that Examples 8 and 9 were run merely to demonstrate certain aspects of this invention

TABLE IV

| TEST NO. | 1 | 2 | 3 | 4 | 5 |
|---|---|---|---|---|---|
| Wedron Sand | 2,000g | 2,000g | 2,000g | 2,000g | 2,000g |
| Phenolic Resin Emulsion | | | | | |
| % Resin | 50% | 50% | 50% | 60% | 60% |
| Amount | 18.8g | 19.9g | 21.5g | 18.5g | 20.1g |
| Polyisocyanate | | | | | |
| Type | Mondur MR | Mondur MR | Mondur MR | Isonate 226 | Isonate 226 |
| Amount | 14.6g | 13.5g | 11.9g | 25.0g | 22.3g |
| Solvent | | | | | |
| Type | Cellosolve Acetate/ Kerosene (5:1) | Cellosolve Acetate/ Kerosene (5:1) | Cellosolve Acetate/ Kerosene (5:1) | None | None |
| Amount | 8.6g | 8.6g | 8.6g | — | — |
| Tensile Strength (Scratch Hardness) | | | | | |
| Immediate | 230 (83) | 193 (81) | 95 (69) | 70 (77) | 90 (72) |
| 2 Hours | 153 (78) | 157 (83) | 125 (75) | 202 (71) | 140 (69) |
| 4 Hours | 223 (85) | 218 (83) | 97 (74) | — | — |
| 24 Hours | 248 (79) | 173 (75) | 80 (69) | 245 (77) | 213 (74) |
| TEST NO. | 6 | 7 | 8 | 9 | 10 |
| Wedron Sand | 2,000g | 2,000g | 2,000g | 2,000g | 2,000g |
| Phenolic Resin Emulsion | | | | | |
| % Resin | 55% | 55% | 45% | 60% | 60% |
| Amount | 20.0g | 17.3g | 19.7g | 19.1g | 19.1g |
| Polyisocyanate | | | | | |
| Type | Isonate 226 | Isonate 181 | Mondur MR | Mondur MR | Mondur MR |
| Amount | 22.0g | 17.7g | 13.7g | 14.3g | 14.3g |
| Solvent | | | | | |
| Type | Cellosolve Acetate | Cellosolve Acetate | Cellosolve Acetate/ Kerosene (5:1) | Glycol Diacetate/ Kerosene (5:1) | Hisol 10/ Kerosene (5:1) |
| Amount | 2.0g | 5.0g | 8.6g | 6.6g | 6.6g |
| Tensile Strength (Scratch Hardness) | | | | | |
| Immediate | 135 (73) | 182 (68) | 100 (67) | 247 (81) | 90 (66) |
| 2 Hours | 167 (74) | 240 (75) | 118 (69) | 195 (78) | 112 (61) |
| 4 Hours | 190 (76) | 205 (70) | 113 (67) | 178 (80) | 125 (66) |
| 24 Hours | 193 (72) | 233 (76) | — | 187 (73) | 130 (73) |

EXAMPLE 8

The following were charged to a reflux reaction vessel: 872 parts phenol, 428 parts 91% paraformaldehyde, 2.23 parts lead naphthenate (24% lead) and 1.02 parts lead oxide. The mixture was heated to 108° C. to initiate the exotherm, then the temperature was held to just below reflux until the free formaldehyde was about 0.1% by weight (about 4 hours); the water content was about 7.3%. The following were added to the hot reaction mixture: about 8 parts Cellosize 15,000H and about 10 parts Tamol SN; the mixture was then cooled to about 100° C. then sufficient water was added while applying high shear mixing and while continuing to cool to form an emulsion containing about 60% by weight resin and about 40% water. The resulting oil-in-water emulsion appeared to be stable.

EXAMPLE 9

The following were charged to a reflux reaction vessel: 264 parts phenol, 236 parts 50% aqueous formaldehyde, and 1.32 parts zinc acetate, then heated to about 100° to 102° C. and maintained at just below reflux conditions until the free formaldehyde was about 3.5%. The following were added to the reaction mixture: 6.2 parts Cellosize 15,000H, 2.8 parts Tamol SN, 6.2 parts gum arabic and 117 parts water, then held at 75° C. for and are not intended to represent the optimum performance of those aspects. Based on these examples, one skilled in the art can readily optimize these aspects for any particular commercial use.

What is claimed is:

1. A binder composition comprising in admixture a resin component, a hardener component and a curing agent, wherein the resin component comprises an aqueous emulsion of a phenolic resin which comprises the condensation product of a phenol having the general formula:

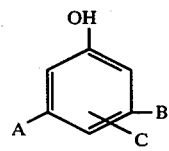

wherein A, B and C are hydrogen, hydrocarbon radicals, oxyhydrocarbon radicals or halogen, with an aldehyde having the general formula R'CHO wherein R' is hydrogen or a hydrocarbon radical of 1 to 8 carbon atoms; the hardener component comprising a liquid polyisocyanate containing at least two isocyanate groups; and the curing agent comprising a tertiary amine or a metal ion.

2. A binder composition according to claim 1 wherein the phenolic resin is a benzylic ether resin containing a unit of the formula

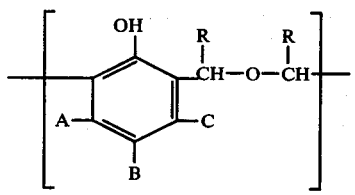

wherein A, B and C are hydrogen, hydrocarbon radicals, oxyhydrocarbon radicals, or halogen and wherein R is a hydrogen or a hydrocarbon radical of 1 to 8 carbon atoms.

3. A binder composition according to claim 1 wherein the phenolic resin is benzylic ether resin having the formula

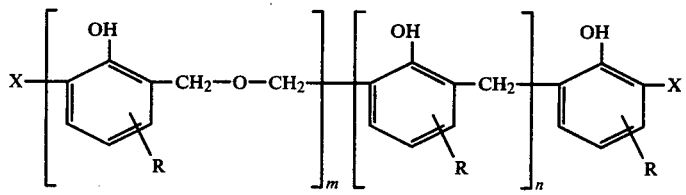

wherein R is hydrogen or a phenolic substituent, the sum of m and n is at least two, the ratio of m to n is at least one, X is hydrogen or methylol end group and the ratio of methylol end groups to hydrogen end groups is at least one.

4. A binder composition according to claim 1, claim 2, or claim 3 wherein the aqueous emulsion of phenolic resin comprises from about 35% to about 75% by weight resin.

5. A binder composition according to claim 1, claim 2, or claim 3 wherein the aqueous emulsion of a phenolic resin comprises from about 45% to about 65% by weight resin.

6. A binder composition according to claim 1, claim 2 or claim 3 wherein the aqueous emulsion of a phenolic resin comprises from about 50% to about 60% by weight resin.

7. A method of binding materials together which comprises applying to the material a binding amount of the binder composition of claim 1, shaping the material into the desired shape and allowing the binder composition to cure.

8. A method according to claim 7 wherein the curing agent is mixed with the resin component or the hardener component.

9. A method according to claim 7 wherein the resin component and hardener component are applied to the material, the material shaped into the desired shape, and the shaped material contacted with a tertiary amine to effect curing of the binder.

10. A method according to claim 8 wherein the tertiary amine is in vapor or gaseous form.

11. A foundry mix containing sand as the major constituent and a binding amount of the binder of claim 1, claim 2 or claim 3.

12. A method of preparing shaped foundry cores or molds which comprises:
(a) forming a foundry mix by uniformly distributing on a foundry aggregate containing sand as the major constituent a binding amount of the resin component, hardener component and curing agent of claim 1;
(b) shaping the foundry mix in a pattern; and
(c) allowing the binder composition in the shaped foundry mix to cure.

13. The method of claim 12 wherein the curing agent is a tertiary amine.

14. The method of claim 13 wherein the curing agent is 4-phenylpropyl pyridine.

15. A method of preparing shaped foundry cores or molds which comprises:
(a) forming a foundry mix by uniformly distributing on a foundry aggregate containing sand as the major constituent a binding amount of the resin component and the hardener component of claim 1;
(b) shaping the foundry mix in a pattern; and
(c) contacting the shaped foundry mix with a tertiary amine to effect curing of the binder.

16. The method of claim 15 wherein the tertiary amine is in vapor or gaseous form.

17. The method of claim 16 wherein the tertiary amine is passed through the shaped foundry mix.

18. The method of claim 16 wherein the tertiary amine is suspended in an inert gas stream which is passed through the shaped foundry mix.

19. The method of claim 18 wherein the tertiary amine is triethyl amine.

20. The method of claim 18 wherein the tertiary amine is dimethylethyl amine.

* * * * *